(12) United States Patent
Tyler

(10) Patent No.: US 12,501,139 B2
(45) Date of Patent: Dec. 16, 2025

(54) ADJUSTABLE DIGITAL CINEMA CAMERA OPTICAL VIEWFINDER

(71) Applicant: Jamarl Tyler, Austin, TX (US)

(72) Inventor: Jamarl Tyler, Austin, TX (US)

(*) Notice: Subject to any disclaimer, the term of this patent is extended or adjusted under 35 U.S.C. 154(b) by 319 days.

(21) Appl. No.: 18/303,736

(22) Filed: Apr. 20, 2023

(65) Prior Publication Data

US 2023/0345103 A1    Oct. 26, 2023

Related U.S. Application Data

(60) Provisional application No. 63/446,796, filed on Feb. 17, 2023, provisional application No. 63/332,977, filed on Apr. 20, 2022.

(51) Int. Cl.
*H04N 23/55* (2023.01)
*H04N 23/51* (2023.01)
*H04N 23/63* (2023.01)

(52) U.S. Cl.
CPC ............ *H04N 23/55* (2023.01); *H04N 23/51* (2023.01); *H04N 23/63* (2023.01)

(58) Field of Classification Search
CPC ........ H04N 23/55; H04N 23/51; H04N 23/63; H04N 23/53; G03B 13/06; G03B 17/565
See application file for complete search history.

(56) References Cited

U.S. PATENT DOCUMENTS

| 6,480,681 | B1* | 11/2002 | Neil | G02B 23/14 |
| | | | | 396/383 |
| 8,477,238 | B2* | 7/2013 | Jannard | H04N 23/50 |
| | | | | 348/372 |
| 2002/0154237 | A1* | 10/2002 | Gelbard | H04N 23/53 |
| | | | | 348/E5.025 |
| 2021/0232024 | A1* | 7/2021 | Endo | G03B 17/55 |

FOREIGN PATENT DOCUMENTS

| JP | 3607727 B2 * | 1/2005 | ............ H04N 5/225 |
| JP | 2023024538 | 2/2023 | |

OTHER PUBLICATIONS

Viper Gears Ninja Adapter Plate: https://www.vipergears.com/product-page/street-stealth-1, 1 pg., accessed Apr. 2023.
Red Approved Company and product: https://www.red.com/third-party-accessories, 20 pgs., accessed Apr. 2023.

(Continued)

*Primary Examiner* — Nhan T Tran
(74) *Attorney, Agent, or Firm* — Rothwell, Figg, Ernst & Manbeck, P.C.

(57) ABSTRACT

An adapter apparatus, comprising a housing comprising two mount parts, wherein when a first optical imaging apparatus and a second optical imaging apparatus are attached to the housing, an image from the first optical imaging apparatus is visible through the second optical imaging apparatus such that a subject of the first optical imaging apparatus is visible to a viewer in focus and in full through the second optical imaging apparatus. The configuration creates a new apparatus via the combination.

18 Claims, 20 Drawing Sheets

(56) References Cited

OTHER PUBLICATIONS

Hasselblad RC-4 Prism Finder: https://www.cameramanuals.org/hasselblad/hasselblad_hc-4_prism.pdf, 6 pgs. accessed Apr. 2023.
Arriflex Periscopic Finder with Arriflex Interchangeable Viewfinder Eyepiece: https://i903.photobucket.com/albums/ac232/jpg-file-2009/IMG_20141025_0002_zps12a0d6d1.jpg, 1 pg., accessed Apr. 2023.
Periscopic Finder Attachment, https://i903.photobucket.com/albums/ac232/jpg-file-2009/IMG_20141025_0003_zps2a2b4758.jpg, 1 pg., accessed Apr. 2023.
Arriflex 16 SR2 Camera Instruction Manual, https://tfma.temple.edu/sites/tfma/files/site-pdfs/Arriflex16SR2.pdf, 61 pgs, accessed Apr. 2023.
Arriflex 16BL self-blimped 16mm camera—Arriflex Corp. of America 1966, 2017, https://archive.org/details/TNM_Arriflex_16BL_self-blimped_16mm_camera_-_Arri_20170926_0036/mode/2up, 1 page, accessed Apr. 2023.
"Arriflex 16BL the Quite 16 mm mirror-shutter professional motion picture camera for location synchronous sound filming", https://www.super8camera.com/manuals/arriflex-16bl-manual.pdf, 34 pgs., accessed Apr. 2023.
Red Komodo Digital Cinema Camera or similar: https://www.red.com/komodo, 16 pgs., accessed Apr. 2023.
Yossy Mendelovich, "The Canon Boxy-Style Cinema Camera Patent was published in Japan", Y.M. Cinema Magazine, https://ymcinema.com/2023/02/21/the-canon-boxy-style-cinema-camera-patent-was-published-in-japan/, 10 pgs., Jul. 2021.
Adam Wilt, Silicon Image NAB 2009-SI-2k, Apr. 20, 2009, https://www.provideocoalition.com/nab_2009_si_2k/, 1 pg., Apr. 20, 2009, 10 pgs.
SI-2K Digital Cinema Camera, Shoot.Edit.Deliver, 10 pgs., http://www.theodoropoulos.info/attachments/076_DB_SI-2K.pdf, 10 pgs. accessed Apr. 2023.
The Arriflex D-21 and D-21 HD, 24 pgs., http://www.davidelkins.com/download/download_files/arri/brochures/d-21_brochure.pdf, 24 pgs., accessed Apr. 2023.
News, "Dalsa Origin Footage Featured in First International Real-time Collaboration on 4K Digital Cinema Content", Sep. 28, 2005 in Tokyo Japan, https://www.teledynedalsa.com/en/news/newsroom/dalsa-origin-footage-featured-in-first-international-real-time-collaboration-on-4k-digital-cinema-content/, 6 pgs., Sep. 28, 2005.
ARRI OVF-1 Optical Universal Viewfinder, https://www.bhphotovideo.com/c/product/1288127-REG/arri_k2_72048_0_ovf_1_optical_universal_viewfinder.html/compatibility, 3 pgs., accessed Apr. 2023.
User Manual ARRI Alexa SXT Studio Camera Body, Instruction Manual, https://www.search-manual.com/arri-alexa-sxt-studio-camera-body-343898-manual, 11 pgs. accessed Apr. 2023.

* cited by examiner

ADJUSTABLE DIGITAL CINEMA CAMERA OPTICAL VIEWFINDER

CROSS-REFERENCE TO RELATED APPLICATIONS

This application claims the benefit of U.S. Provisional Application No. 63/332,977, filed Apr. 20, 2022 and U.S. Provisional Application No. 63/446,796, filed Feb. 17, 2023, the entire contents of which are fully incorporated herein by reference.

TECHNICAL FIELD

The subject matter disclosed herein is generally directed to optical adapters for cameras including cinema optical viewfinder.

BACKGROUND

Camera optical viewfinders such as the NC-2, HC-3, HC-4, RM-2 for medium format cameras such as the Hasselblad 500 series or the Kiev88 are currently used with digital cinema cameras such as the Red Komodo as they allow an optical viewfinder solution for these cameras. The existing medium format camera optical viewfinders mount on the top of these cameras and require the user to view through the viewfinder from the rear or top of the camera rather than from the side, which is done with traditional optical viewfinders for cinema cameras. This creates a problem by making the optical viewfinder configuration unusable for handheld camera work if doing traditional shoulder mount camera operation and forces the operator to hold the camera rig in front of the body which can be very uncomfortable and front heavy for the operator. Likewise, even if the camera rig is on a tripod, the operator is restricted, if utilizing the medium format optical viewfinder, to viewing from the top or rear of the camera, which can be a problem if the tripod is raised too high or too low.

This invention allows the camera operator of a camera (e.g., Red Komodo) using an optical medium format camera viewfinder to have a side viewer option to view the camera image from the side without needing a wired or wireless video feed, or power source for the viewfinder.

This invention creates an option for an operator of a camera such as the Red Komodo utilizing a medium format optical viewfinder greater accessibility to view the camera image from the side of the camera without the needing an additional power source, cables, or digital configuration of the viewfinder.

Current digital cinema camera configurations, many of which are currently used in motion picture production, do not allow for the camera operator to view the camera image through a viewfinder or eyepiece in the traditional way of a motion picture camera. The motion picture camera industry led by companies such as Arriflex developed the design of motion picture cameras to allow for an optical viewfinder which gives the camera operator the ability to view the camera image from multiple positions and specifically from the side of the camera facing front, which is often the most practical position for common filming techniques such as handheld and tripod mounted camera operation.

Today, camera operators of digital cinema cameras are forced to use electronic devices such as an externally attached electronic display monitor or electronic viewfinder to see the camera image, or a built-in-camera display monitor or electronic viewfinder. A drawback with these electronic devices is they require a power source, specific power configurations, and specific digital settings to work, or as in the case of a built-in-camera display monitor they are only in one position on the camera, thus requiring additional effort by the camera operator to accommodate those requirements when using those electronic devices to view the digital cinema camera image. Another problem is that a camera operator may want to use an optical viewfinder rather than an electronic viewing device for many reasons, simplifying the camera set up being one, difficulty viewing an electronic screen in a bright environment being another, which is why some people are using still-camera viewfinders on the top of the Red Komodo.

A company called Viper Gears has produced a device called the Ninja Adapter Plate which attaches to the top of the Red Komodo digital cinema camera around the built-in-display monitor and allows existing Film Camera optical viewfinders such as the NC-2, HC-3, HC-4, RM-2, for cameras such as the Hasselblad 500 series or the Kiev88, to mount on the top of the Red Komodo via the Viper Gears Ninja Adapter Plate, allowing the camera operator to view the built-in-camera display monitor through the optical viewfinder like a traditional camera. However, the camera operator of the digital cinema camera is still limited by the position of the existing optical viewfinder utilized which are designed for still film cameras and not motion picture cameras.

While the Viper Gears Ninja Adapter Plate coupled with an optical viewfinder such as the HC-4 solve some restrictions caused by using electronic devices, it does not give the camera operator the ability to view the camera image in the traditional way with motion picture cameras, from multiple positions, or specifically from the side of the camera facing front which is often the most practical position for common filming techniques.

SUMMARY

In one aspect, the present disclosure provides an adapter apparatus, comprising a housing comprising two mount parts, wherein when a first and a second optical imaging apparatuses are attached to the housing, an image from the first optical imaging apparatus is visible through the second optical imaging apparatus such that a subject of the first optical imaging apparatus is visible to a viewer in focus and in full through the second optical imaging apparatus.

In some embodiments, the subject of the first optical imaging apparatus is a display screen of camera to which the first optical imaging apparatus is mounted over. In some embodiments, the camera is a digital cinema. In some embodiments, the second optical imaging apparatus is adjustable to diverse angles. In some embodiments, the second optical imaging apparatus is adjustable to a side of the first imaging apparatus.

In some embodiments, the first optical imaging apparatus is mounted in reverse over a display screen of a camera via at least one of the mounting parts, and one end of the adapter apparatus is attached to the first optical imaging apparatus and the opposite end of the adapter apparatus is attached to the second optical imaging apparatus, wherein the second optical imaging apparatus comprises a viewfinder, wherein the resulting combination of the first and the second optical imaging apparatuses and the adapter apparatus causes the display screen to be visible through an eyepiece of the viewfinder of the second optical imaging apparatus, thus allowing an operator to hold the camera over the shoulder of the operator or from a diverse angle, and still see the display screen in focus and whole. In some embodiments, the camera is a digital cinema camera. In some embodiments, the second optical imaging apparatus comprises a periscopic attachment. In some embodiments, the second optical imaging apparatus does not comprise a periscopic attachment.

In another aspect, the present disclosure provides an imaging apparatus comprising the adaptor apparatus herein, the first optical imaging apparatus, and the second optical imaging apparatus.

In another aspect, the present disclosure provides a method of capturing an image of a subject using the imaging apparatus herein.

These and other aspects, objects, features, and advantages of the example embodiments will become apparent to those having ordinary skill in the art upon consideration of the following detailed description of illustrated example embodiments.

BRIEF DESCRIPTION OF THE DRAWINGS

An understanding of the features and advantages of the present invention will be obtained by reference to the following detailed description that sets forth illustrative embodiments, in which the principles of the invention may be utilized, and the accompanying drawings of which.

DETAILED DESCRIPTION

Figure 1:
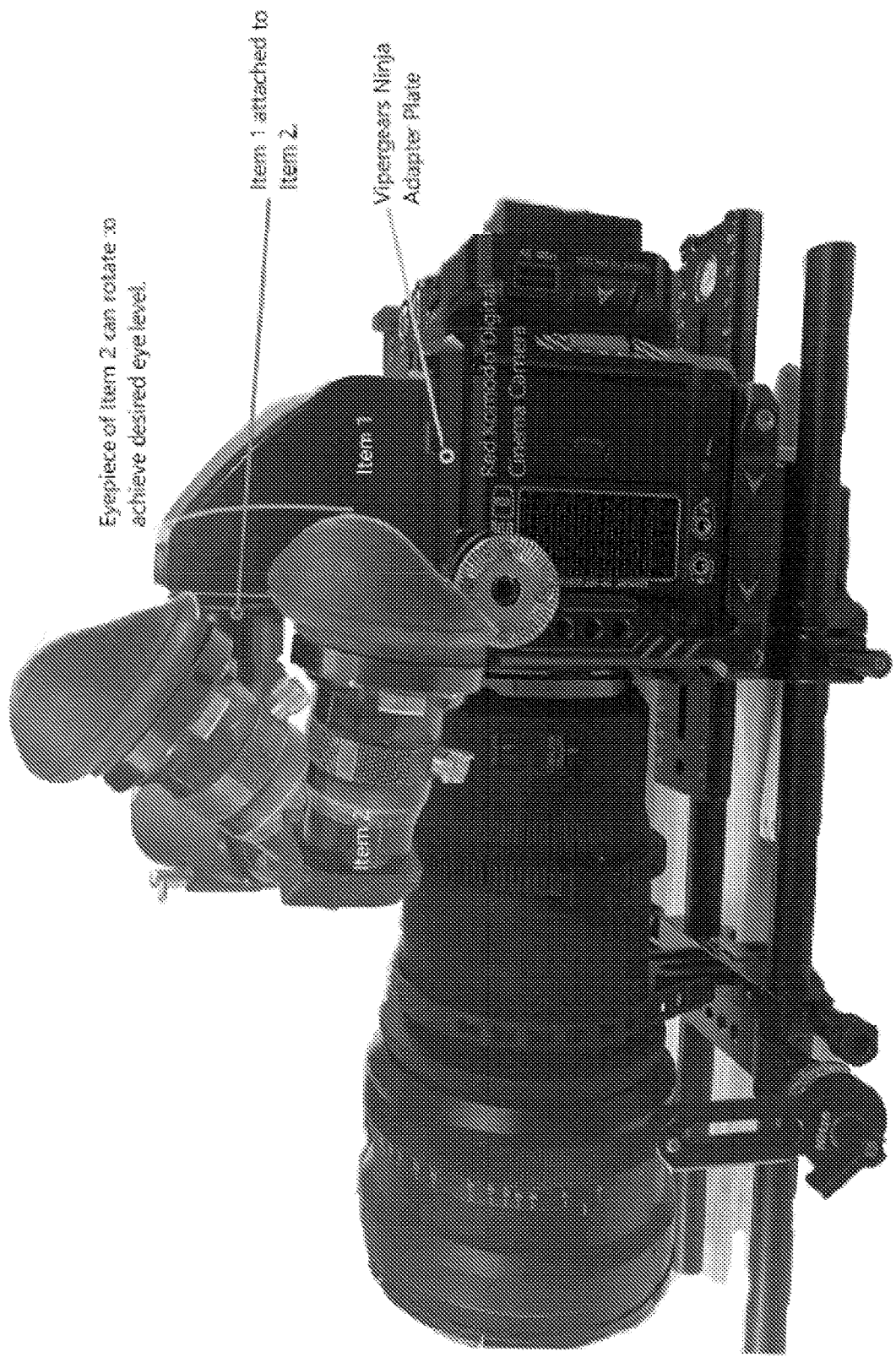
FIG. 1 shows an example of an adaptor and camera according to some example embodiments.

In one aspect, the present disclosure provides an apparatus that has a combination of optical viewfinders for medium format and cinema cameras creating a new viewfinder. In some embodiments, the invention creates an option for an operator of a camera such as the Red Komodo utilizing a medium format optical viewfinder greater accessibility to view the camera image from the side of the camera without needing an additional power source, cables, or digital configuration of the viewfinder.

As stated above, camera optical viewfinders such as the NC-2, HC-3, HC-4, RM-2 for medium format cameras such as the Hasselblad 500 series or the Kiev88 are currently used with digital cinema cameras such as the Red Komodo as they allow an optical viewfinder solution for these cameras. The existing medium format camera optical viewfinders mount on the top of these cameras and require the user to view through the viewfinder from the rear or top of the camera rather than from the side which is done with traditional optical viewfinders for cinema cameras. This creates a problem by making the optical viewfinder configuration unusable for handheld camera work if doing traditional shoulder mount camera operation and forces the operator to hold the camera rig in front of the body which can be very uncomfortable and front heavy for the operator. Likewise, even if the camera rig is on a tripod, the operator is restricted, if utilizing the medium format optical viewfinder, to viewing from the top or rear of the camera which can be a problem if the tripod is raised too high or too low. The invention claimed here solves this problem.

By taking the optical viewfinder from a traditional cinema camera such as a Kinoptik viewfinder from a Debrie CX 16 mm camera or from other cameras such as the Arriflex 16b1 extended viewfinder and adapting such to a modified medium format camera optical viewfinder such as the NC-2 or others, the combined viewfinders provide the functionality of a traditional optical side viewfinder found on cinema cameras. This allows the camera operator on cameras using a medium format optical viewfinder such as the Red Komodo to utilize the side optical cinema viewfinder for handheld work including traditional shoulder mount operation, or any other camera position in which the side mounted cinema camera viewfinder is traditionally used.

The claimed invention differs from what currently exists. Prior to this invention, the only side viewfinders for a camera such as the Red Komodo are electronic monitor accessories that receive a video feed from the camera either wire or wireless means. This invention allows the operator of a camera such as the Red Komodo utilizing a medium format optical viewfinder to use a cinema camera optical side viewfinder which is more accessible for camera operation.

This invention is an improvement on what currently exists. Prior to this invention, the only side viewfinders for a camera such as the Red Komodo are electronic monitor accessories that receive a video feed from the camera either by wire or wireless means. This invention allows the operator of a camera such as the Red Komodo utilizing a medium format optical viewfinder to use a cinema camera optical side viewfinder which is more accessible for camera operation.

The electronic side view options that are available for digital cinema cameras like the Red Komodo require a power source as well as a wired or wireless video feed from the camera to the viewfinder which can be cumbersome for the camera operator and may require complex technical configuration of the device. The current medium format optical viewfinders mounted on a camera such as the Red Komodo restrict the operator to viewing the camera image from the rear or above the camera which prevents traditional shoulder mounted handheld camera work or other camera positions where that viewfinder is not accessible.

In some aspects, this invention creates an option for an operator of a camera such as the Red Komodo utilizing a medium format optical viewfinder greater accessibility to view the camera image from the side of the camera without the needing an additional power source, cables, or digital configuration of the viewfinder.

In some aspects, the invention creates a new type of optical viewfinder to use with a Red Komodo or similar digital video cameras that have a mounting adapter attached like the Vipergears Ninja Adapter Plate or a medium format still camera such as the Hasselblad 500 series camera that accept medium format viewfinders like the NC-2. A custom developed device can be created which utilizes the same or similar optics and configuration of the two combined viewfinders but is manufactured as a new standalone item. The device may also be used on additional digital cameras such as the Red Rapter in addition to the Red Komodo if they use the Vipergears Ninja Adapter Plate or similar Adapter Plate that mounts a similar viewfinder.

Example Embodiments of Using the Adaptors and Camera s Herein Include

1. A viewfinder, e.g., Hasselblading NC-2 or similar;
2. Kinoptiking viewfinder from a Debrie CX 16 mm camera or similar;
3. Removing the eyepiece of the Hasselblad NC-2 viewfinder so there are no optics obstructing the opening of the eyepiece into the body of the viewfinder;
4. Cutting the metal stem of the Kinoptik or similar viewfinder to the correct length that achieves a focused view of the full field of view of the Hasselblad viewfinder prism when attached to the eyepiece opening of the Hasselblad viewfinder body;
5. Securing the resulting modified Kinoptik or similar viewfinder on the eye piece opening of the Hasselblad viewfinder body by soldering it securely;
6. Reviewing the bottom mounting plate ring of the NC-2 viewfinder or similar by unscrewing it, turning it around 180 degrees and screwing it back on so that when mounted on the Red Komodo the Kinoptik viewfinder will be emerging from the front of the camera and curving around to the left side of the camera allowing the operator to view through it from the left side of the camera; similarly, the HC-4 or similar viewfinder can be mounted sideways at a 90 degree position on either side of the camera with the Kinoptik or Arriflex style viewfinder achieving additional diverse angles with or without a periscopic attachment, and/or
7. Vipergearing Ninja Adapter plate to accept Kiev 88 or Hasselblad waist level finders and similar viewing accessories.

Relationship between the components of an example apparatus:

Perform step 3 on item 1 so that item 2 can be placed through the eyepiece hole on item 1 to find the correct measurement that achieves step 4. After step 4 is complete perform steps 5 and 6 so that device can be mounted on item 7 for use. Step 4 has two parts which is finding the correct focal length measurement that achieves the full field of view of the item 1 prism image as viewed through the eyepiece of item 2 when placing the bottom of item 2 through the eyepiece hole of the body of item 1 and then cutting the bottom of item 2 at that measurement so it can be attached to item 1 at the correct measurement.

How example embodiments of the invention works:

In some embodiments, the combining of items 1 and 2 as describe in steps 3, 4, 5, and 6 allow the new device to be mounted on item 7 that the camera operator must already attach to a Red Komodo. The camera operator after powering up the camera is then able to view the full display from the camera through the new viewfinder from the side of the camera like a traditional cinema camera which is the optimally accessible method of viewing the camera image for many operators as it allows for traditional handheld shoulder mount work where the bulk of the weight of the camera rig falls onto the shoulder of the operator which is the most stable method of handheld camera operation without additional support.

How to make example embodiments of the invention:

In some embodiments, take item 1 and remove the eyepiece including the optical glass and place it on a lighted surface like a light table for photography that allows a viewable image through the item 1 prism that can be checked for focus and field of view. A lighted transparent 1:1 scale image of the Red Komodo screen display should be used with item 1 on top of it to check focus and field of view. Take item 2 and insert the bottom of it into the eyepiece opening of item 1 and look through the eyepiece of item 2 while moving the bottom of item 2 to the correct distance from the prism in the body of item 1 that achieves focus and the full field of view of image from item 1 when viewed through the eyepiece of item 2. Mark and cut the bottom of item 2 at that precise measurement that allows the cut end of the bottom of item 2 to be attached to the surface of item 1 at the eyepiece opening to maintain focus and field of view when items 1 and 2 are secured together in that configuration. Then secure them by soldering them together in that configuration. This is done in a configuration such that when the completed item is facing away from the user the side viewfinder of item 2 curves back around to the left side of the completed item for viewing use as it would when attached to the original cinema camera it was used with. Then reverse the mounting plate on the bottom of item 1 of the new device so it can be mounted in the new configuration, and it is ready to use on a Red Komodo with the Vipergears Adapter Plate or on a Hasselblad 500 series or similar camera.

Additional reinforcement to the soldering of items 1 and 2 in step 4 may be useful to make sure the two items are firmly secured. Additional metal rings such as correct size washers or screws soldered or screwed in place to secure the items in place. Item 1 is necessary as it contains the prism through which the camera image is translated. Item 2 is necessary as it takes the image from the prism and reflects it to the side viewfinder which is also adjustable for the user. Item 7 mounts the device to the camera. In some embodiments, a product herein may comprise some or all the elements described herein.

A prism such as that from item 1 can be combined with a viewfinder such as item 2 to create the product from scratch rather than using preexisting components. Item 1 or 2 could be created from scratch and combined with a preexisting item 1 or 2 in which one item of the combination of the two is created from scratch and used with the preexisting second item. A different adapter plate from item 7 could be created or used that provides the same function. All of the items herein could be created as a standalone device from scratch rather than using preexisting components.

How to use example embodiments of the invention:

In some aspects, this invention allows the new device to be mounted on a Vipergears Ninja Adapter Plate (item 7) that the camera operator must already attach to a Red Komodo. The camera operator after powering up the camera is then able to view the full display from the camera through the new viewfinder from the side of the camera like a traditional cinema camera which is the optimally accessible method of viewing the camera image for many operators as it allows for traditional handheld shoulder mount work where the bulk of the weight of the camera rig falls onto the shoulder and center body mass of the operator which is the most stable method of handheld camera operation.

In some embodiments, the invention creates a new type of optical viewfinder, e.g., to use with a Red Komodo or similar digital video cameras that have a mounting adapter attached like the Vipergears Ninja Adapter Plate or a medium format still camera such as the Hasselblad 500 series camera that accept medium format viewfinders like the NC-2. A custom developed device can be created which utilizes the same or similar optics and configuration of the two combined viewfinders but is manufactured as a new standalone item. The device could also be used on additional digital cameras such as the camera in U.S. 2021/0232024, which is incorporated by reference in its entirety, in addition to the Red Komodo if they use the Vipergears Ninja Adapter Plate or similar Adapter Plate that mounts a similar viewfinder.

In some embodiments, this invention allows a camera operator with but not limited to a digital cinema camera such as a Red Komodo, to view the camera image in the traditional way of but not limited to a motion picture camera, from multiple positions, or from the side of the camera facing front, using an optical viewfinder, without the need for any external electronic device, using a Digital Camera Optical Viewfinder. In some embodiments, this invention enables the camera operator of but not limited to a digital cinema camera such as the Red Komodo to view the camera image from the side and facing forward and from multiple positions without needing a wired or wireless video feed, or power source for the viewfinder itself.

In some embodiments, this invention uses devices, coupled and uncoupled, like an adapter plate or built-in-mount like but not limited to the Viper Gears Ninja Adapter Plate attached to but not limited to a digital cinema camera such the Red Komodo, or in some embodiments, the invention can be directly attached to a camera by screws or other mounting technique. In some embodiments, this invention uses a viewfinder such as but not limited to the Hasselblad HC-4 coupled with an eyepiece like but not limited to those common with Arriflex motion picture cameras such as the BL and SR1, and 2 series. In some embodiments, this invention can use an offset periscope viewfinder such as but not limited to those by Arriflex used for Arriflex 3511C, 16M, 16S, 16BL, and 16SR1, and 2 series motion picture cameras. In some embodiments, using this invention with combinations of but not limited to the devices mentioned in this paragraph, allows a camera operator with but not limited to a digital cinema camera such as with a Red Komodo, to view the camera image in the traditional way of but not limited to a motion picture camera, from multiple positions, or from the side of the camera facing front, using an optical viewfinder, without the need for any external electronic device.

Figure 2:
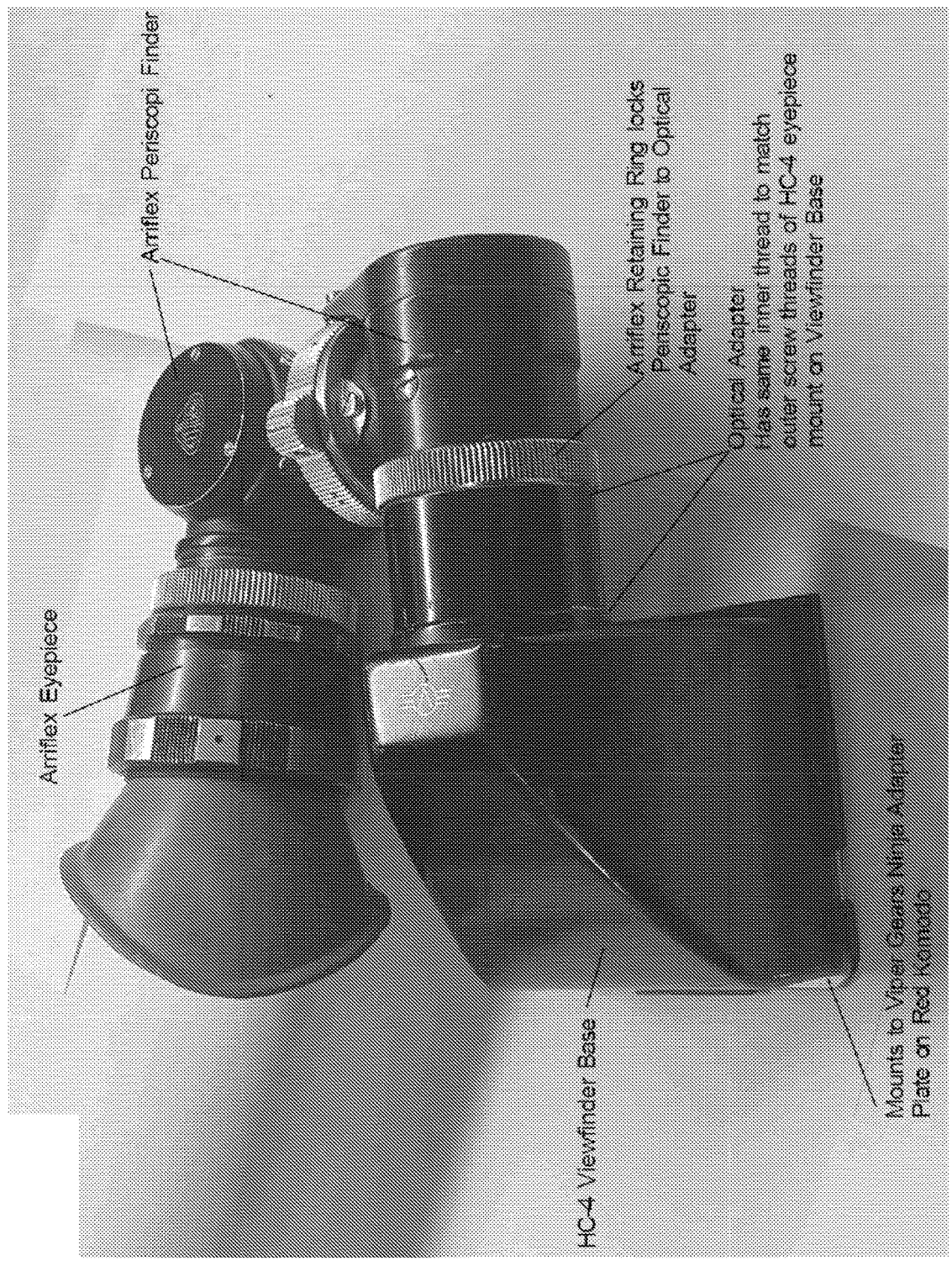
FIG. 2 shows an example of an adaptor and camera according to some example embodiments.
Figure 3:
FIG. 3 shows example optical viewfinder mounted on the side of a camera.
Figure 4:
FIG. 4 shows an example of an adaptor and camera according to some example embodiments used the field.
Figure 5:
FIG. 5 shows the view of a display screen of a camera with an adapter according to some example embodiments.
Figure 6:
FIG. 6 shows an example of an adaptor and camera according to some example embodiments.
Figure 7:
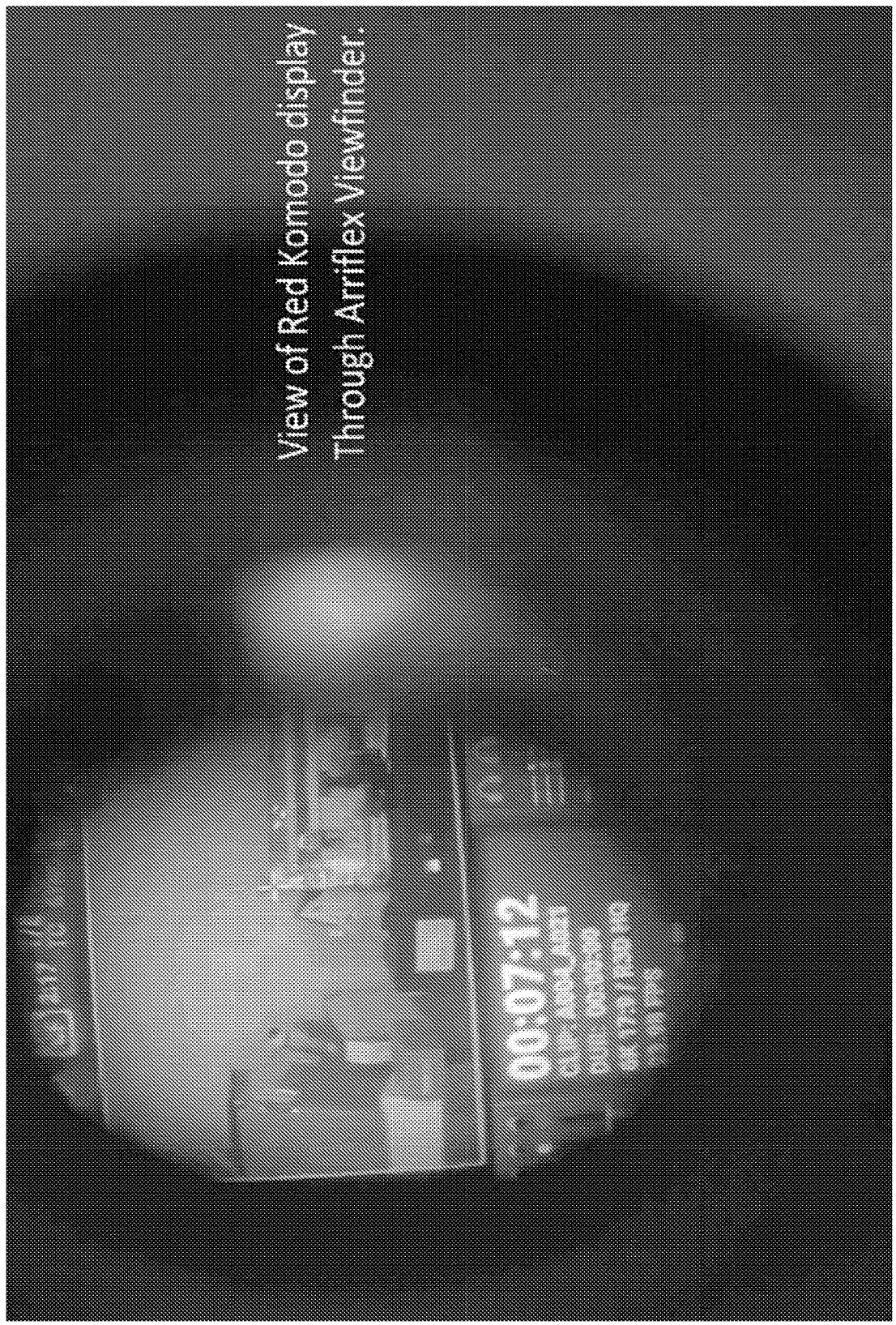
FIG. 7 shows a view of display through an example viewfinder.
Figure 8:
FIG. 8 shows an example of an adaptor and camera according to some example embodiments.
Figure 9:
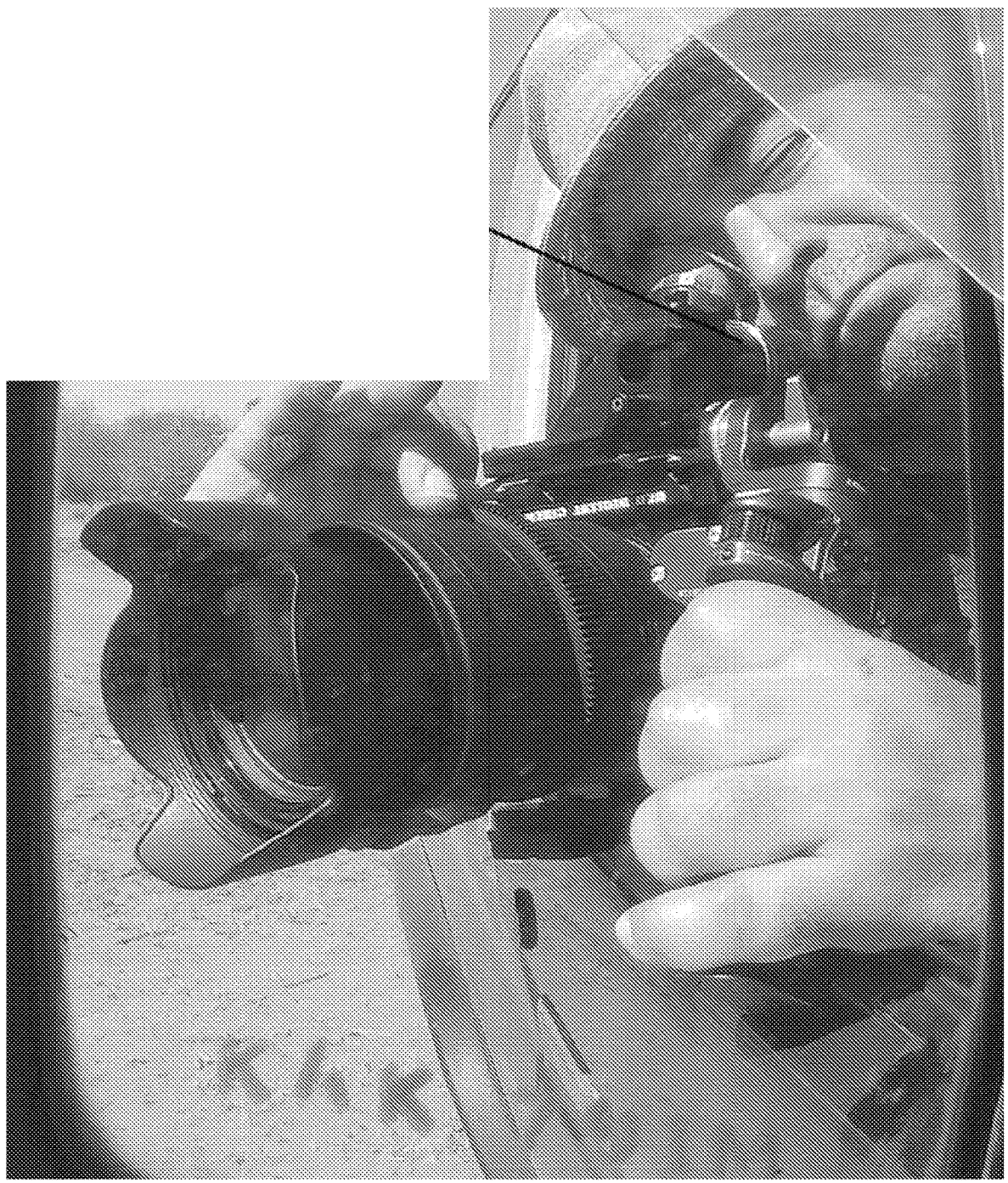
FIG. 9 shows an example of an adaptor and camera according to some example embodiments used in the field.
Figure 10:
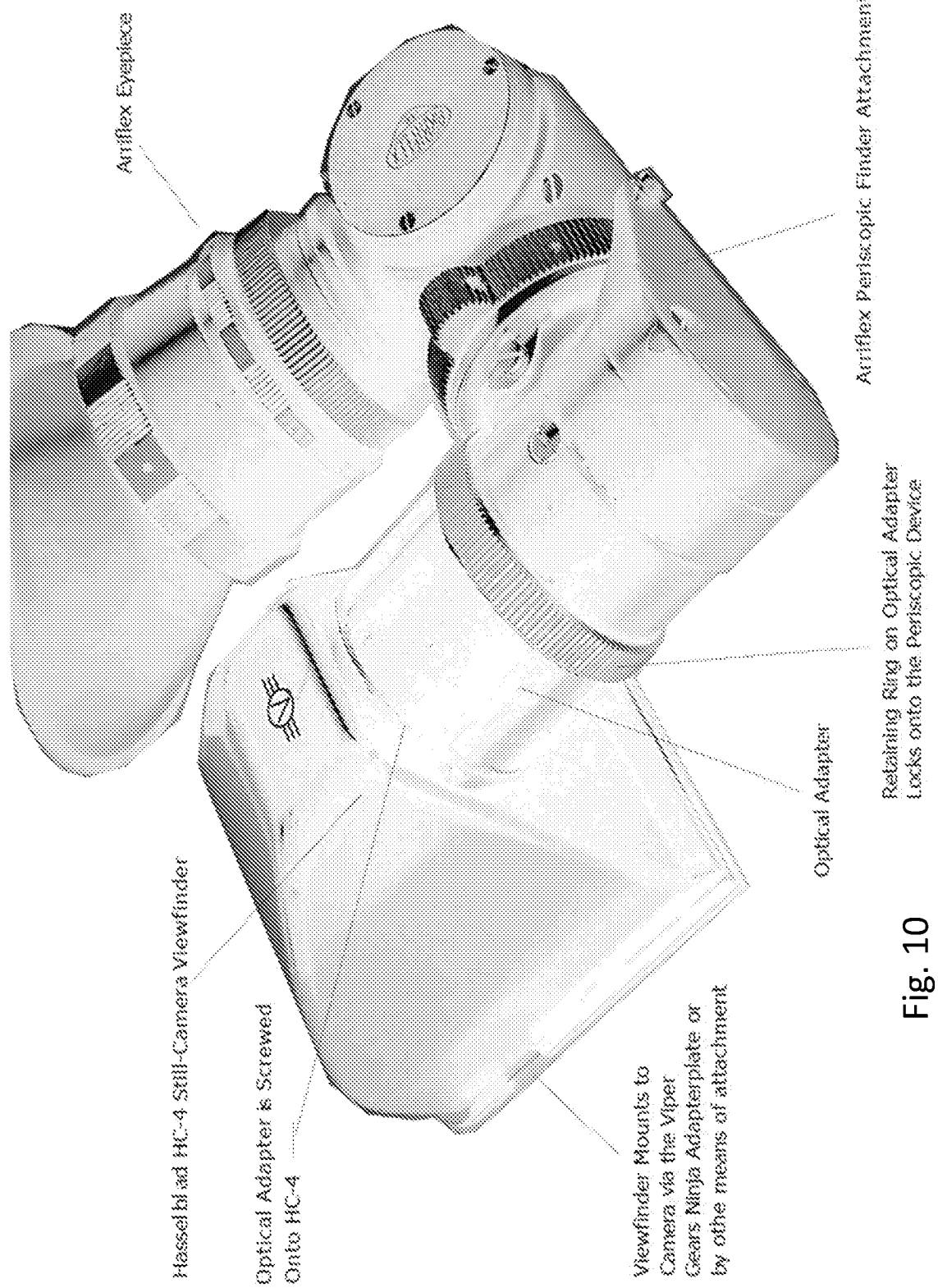
FIG. 10 shows an example adjustable digital cinema camera optical viewfinder.

In some embodiments, a configuration of this invention utilizes a Red Komodo with an attached Viper Gears Ninja Adapter Plate mounted around the built-in-camera display monitor, a Hasselblad HC-4 viewfinder mounted on the Adapter Plate in 180 degree reverse position and with the Hasselblad eyepiece removed from the HC-4 viewfinder and replaced with a new original device called the Optical Adapter, and an Arriflex Periscopic Finder Attachment with an Arriflex eye-piece such as those used with the Arriflex 3511C, 16M, 16S, 16BL, or 16SR1, and 2 series motion picture cameras is attached to the Optical Adapter. The Optical Adapter is the part that adapts the optical image from the viewfinder, in this case the HC-4 without the original eyepiece, and the Arriflex eyepiece with the Arriflex Periscopic Finder Attachment. The resulting configuration enables a camera operator of but not limited to a digital cinema camera such as the Red Komodo the ability to view the camera image, through an optical viewfinder attached to the Optical Adapter, from multiple positions and specifically from the side of the camera facing front, which is often the most practical position for common filming techniques such as handheld and tripod mounted camera operation. In this case as shown in FIG. 2, the Optical Adapter is a hollow aluminum tube about 21 mm long and around 35 mm wide and around 1 mm thick although measurements can vary. On the end that attaches to the HC-4 are "female" screw threads that match those that mount the eyepiece of the HC-4. On the other end of the tube is a rotating retaining ring that can lock onto the screw threads of an Arriflex screw mount for a Periscopic Finder Attachment or similar viewfinder.

In some embodiments, the Optical Adapter portion of the invention replaces the eyepiece and attaches to the base of the viewfinder such as but not limited to a Hasselblad HC-4. This can be done by screwing in the Optical Adapter where the viewfinder eyepiece was or attaching it by other means so long as it is securely attached to the viewfinder. Within the viewfinder, such as but not limited to the HC-4 is a prism, or mirror, through which the image of the built-in-display monitor of a digital cinema camera such as the Red Komodo, is reflected out of the viewfinder through an opening which may contain an additional lens element to improve the image size or focus. The Optical Adapter can be a tube or other shape attachment that is a certain length to provide the correct image focus for viewing through an Arriflex Periscopic Finder Attachment with Arriflex eyepiece attached to another portion of the Optical Adapter such as the opposite side to the viewfinder. The Optical Adapter can be made from aluminum, steel, very hard plastic, or other materials that will produce a very hard object with a wide enough passageway through which to view the image from the viewfinder and light enough weight so as not to break the viewfinder or adapter plate.

Another configuration could substitute a different motion picture camera viewfinder array for the Arriflex Periscopic Finder attachment, such as the array from the Arriflex 16SR1, and 2 series cameras which also has a periscopic element that connects to the Arriflex eyepiece and to the Optical Adapter. Likewise, a completely new assembly can be made that has the capabilities of the devices used herein with but not limited to a digital cinema camera such as the Red Komodo with the Viper Gears Ninja Adapter Plat, the Hasselblad HC-4 viewfinder, the Optical Adapter, the Arriflex Periscopic Finder attachment with attached Arriflex eyepiece. Such a new assembly could perform the same function and consist of a prism or a series of mirrors and lens elements to bring the digital cinema camera display image to an optical viewfinder in similar fashion that enables the camera operator of but not limited to a digital cinema camera such as the Red Komodo to view the camera image through an optical viewfinder from the side of the camera and facing front, and from multiple positions, in the traditional manner as with an optical viewfinder with a motion picture camera, without needing a wired or wireless video feed, or power source for the viewfinder itself.

There is currently no known solution for a digital cinema camera such as but not limited to a Red Komodo to utilize a side optical viewfinder such as but not limited to those of Arriflex 35IIC, 16M, 16S, 16BL, and 16SR1, and 2 series motion picture cameras, or any type. Prior to this invention, the only side viewfinders for a digital cinema camera such as the Red Komodo were electronic monitor accessories that receive a video feed from the camera either by wire or wireless means. In some embodiments, this invention, an Adjustable Digital Cinema Optical Viewfinder, enables a method of camera operation with a digital cinema camera in the traditional way of a motion picture camera, using an adjustable motion picture camera or similar optical viewfinder to view the digital cinema camera image from multiple positions, or from the side of the camera facing forward, as done in traditional motion picture operation such as handheld and tripod mounted work, without the need for any external electronic viewing device. In some embodiments, the Optical Adaptor portion of the invention adapts a viewfinder such as but not limited to the Arriflex Periscopic Finder Attachment or the periscopic viewfinder of an Arriflex 16SR1 or 2 series motion picture camera, to another viewfinder such as but not limited to a Hasselblad HC-4, which can currently be mounted on the Red Komodo using a Viper Gears Ninja Adapter Plate or similar mount or device, by mounting the Optical Adapter to the HC-4 in place of the HC-4 eyepiece, to view the camera display through the Arriflex viewfinder also attached to the Optical Adapter.

Many current digital cinema camera configurations, some of which are used in motion picture production, do not have viewfinders or adjustable LCD display screens to view the camera image but have LCD display screens or screens with similar function built into the camera body and do not allow for the camera operator to view the camera image LCD display screen through an optical viewfinder or eyepiece in the traditional way of a motion picture camera which is from multiple positions and specifically from the side of the camera facing front, which is often the most practical position for common filming techniques such as handheld and tripod mounted camera operation. Many camera operators of digital cinema cameras are forced to use electronic devices such as an externally attached electronic display monitor or electronic viewfinder to see the camera image, or a built-in-camera display monitor or electronic viewfinder. A drawback with these electronic devices is they require a power source, specific power configurations, and specific display settings to work, or as in the case of a built-in-camera LCD display monitor they are only in one position on the camera, thus requiring additional effort by the camera operator to accommodate those requirements when using those electronic devices to view the digital cinema camera image. Another drawback using various LCD displays or monitors is in bright light situations they can be hard for the camera operator to see, which is not the case with an optical viewfinder. Camera optical viewfinders for medium format still photography cameras or similar such as the Hasselblad 500 series or the Kiev88 are currently used with digital cinema cameras such as the Red Komodo as they allow a limited optical viewfinder solution to view the LCD display for these cameras but they create a problem by making the optical viewfinder configuration inadequate for handheld camera work if doing traditional shoulder mount camera operation and force the operator to hold the camera rig in front of the body which can be very uncomfortable and front-heavy for the operator. If the camera rig is on a tripod the operator is also restricted to viewing from the top or rear of the camera which can be a problem if the tripod is raised too high or too low or not accessible from those limited positions.

In some embodiments, the present disclosure provides an accessory that connects a viewfinder such as but not limited to the Hasselblad HC-4, to an eyepiece such as but not limited to those common to Arriflex motion picture cameras such as the 16S, BL, and SR1, and 2 series attached to an optical periscopic device such as but not limited to the Arriflex Periscopic Finder Attachment or similar, at the correct distance to relay the built-in LCD display image of the camera through the arrangement of devices to the viewer looking through the eyepiece, while maintaining full view and sharp focus of the LCD display image. In some embodiments, this invention allows a camera operator with a digital cinema camera such as but not limited to a Red Komodo, to view the camera image in the traditional way of a motion picture camera, from multiple and adjustable positions, including from the side of the camera facing front, using an optical viewfinder without the need for any external electronic device, creating an Adjustable Digital Cinema Camera Optical Viewfinder.

Before this invention, the only ways to view the image from a digital cinema camera such as but not limited to the Red Komodo, other than by glancing at the built in LCD display on the camera, were either by external electronic device which can be cumbersome for the camera operator and may require complex technical configuration and need a power source and electronic signal connectivity, or by attaching an existing optical viewfinder over the built-in camera LCD display. The current medium format optical viewfinders mounted on a camera such as the Red Komodo restrict the operator from adjusting the angle of the viewfinder as can be done with traditional motion picture cameras such as but not limited to popular models by Arriflex such as the 16S, BL, and SR series, which are conducive to hand-held and other traditional forms of filming.

The example prototype device according to certain embodiments uses existing parts with the addition of the Optical Adapter to create the Adjustable Digital Cinema Optical Viewfinder but such a configuration could be created from similar elements as a new device.

Figure 11A:
FIGS. 11A-11H show details of an example optical adaptor for an adjustable digital cinema camera optical viewfinder.

FIG. 11A shows further details on a functioning optical adaptor of the present disclosure. The parts for the optical adaptor include: 1) an adapter tube with a retaining threaded screw mount at the bottom end fitted to mount on the base screw heads (6), e.g., the adapter tube having a 21 mm diameter; 2) an optional reinforcement piece 1 to fit inside the adapter tube (1) to adapt for adjustable length via internal threads; 3) an optional reinforcement piece 2 to work with the optional reinforcement piece 1 via external threads or to provide additional stability to the adapter tube (1); 4) a lid for retaining ring (5) to secure it to the adapter tube (1) while allowing the retaining ring to rotate. Borehole drilled to 21 mm diameter to Viewfinderbase optical extension; 5) a retaining ring; 6) Viewfinder base.

Figure 11B:

FIG. 11B shows a Lid (4) to keep the Retaining Ring (5) in place but able to be rotated has an opening of same the diameter as the Optical Extension from the Viewfinder Base (6) to fit securely.

Figure 11C:

FIG. 11C shows the Adapter Tube (1.) is secularly attached to the Viewfinder Base (6.) in this case via the screw threads on the base matching the internal threads of the Adapter Tube. The Adapter Tube is cut to 21 mm length but can be of varying or adjustable length. A locking mechanism such as a locking screw could be added to the Optical Adapter to lock it in place on the Viewfinder Base.

Figure 11D:

FIG. 11D shows an additional screw thread (3. [2nd Optional Reinforcement Piece]) can be added to the interior of the Adapter Tube (1.) and secured onto the Lid (4.) to allow for an adjustable length of the Optical Adapter. This will work if the Adapter Tube has matching internal threads as envisioned by the first Optional Reinforcement Piece (2.) which would be the internal threads of the Adapter Tube. A locking mechanism could be added such as but not limited to a locking screw to help secure that type of configuration. The Retaining Ring (5.) is seen in position held in place by the Lid which secures it but allows it to rotate. The Retaining Ring has an inner screw thread to mount other devices such as Periscopic Finder Attachment.

Figure 11E:

FIG. 11E shows a view to show how the interior of the Adapter Tube might look with Optional Reinforcement Pieces to provide an adjustable length.

Figure 11F:

FIG. 11F shows an Optical Adapter mounted onto but not limited to the HC-4 or similar Viewfinder Base and an Arriflex Motion Picture Camera optical viewfinder and/or Periscopic Viewer Attachment or similar or other viewing devices can be attached to the Optical Adapter such as by the Retaining Ring. Different size retaining rings can be used to attach different viewing attachments. Different length adapter tubes can be used to correct focus through the viewfinder eyepiece or an adjustable adapter tube can be used that has an adjustable length to achieve optimal viewing. Likewise, a viewing extension can be attached. It is also possible to use an electronic viewing attachment with the Optical Adapter. A locking mechanism such as a locking screw could be added to the Optical Adapter to lock it in place on the HC-4 or other viewfinder base.

Figure 11G:

FIG. 11G shows a sideview of the Optical Adapter. Strong glue or soldering of pieces can be used to combine pieces. The Retaining Ring is rotatable to allow locking.

Figure 11H:
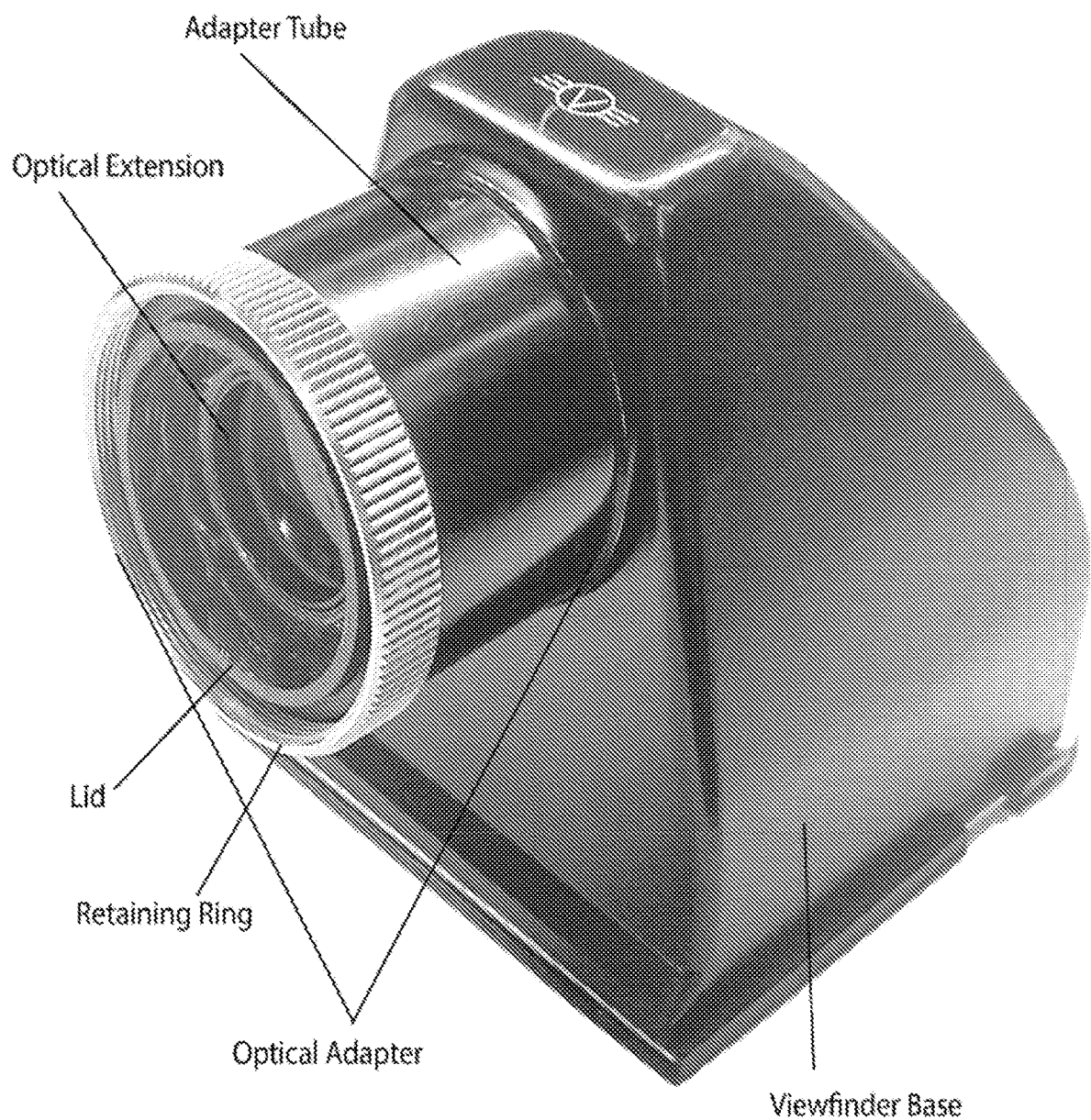
Figure 12:
FIG. 12 shows a sideways configuration of the invention and a camera.
Figure 13:
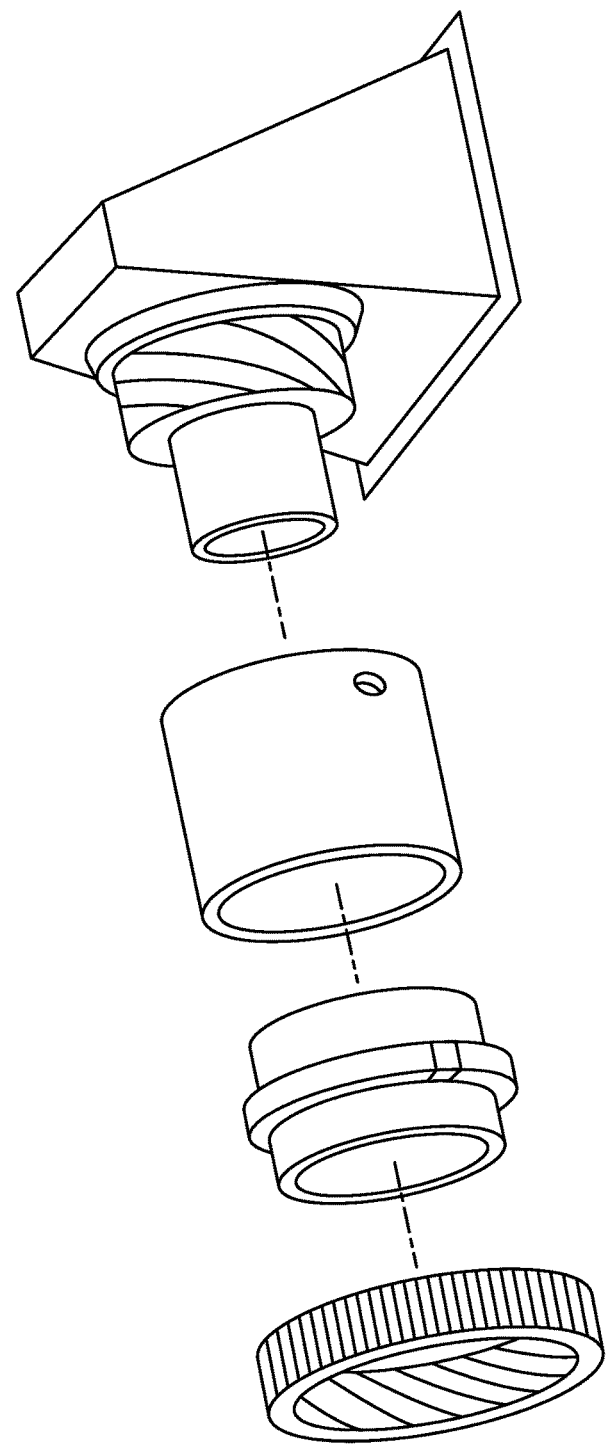
FIG. 13 shows exemplary parts of an optical adaptor for adjustable digital cinema camera optical viewfinder.

FIG. 11H shows an optical adapter formed by combining the Adapter Tube with the correct length of about but not limited to 21 mm for optimal focus in this case with an Arriflex Periscopic Viewer Attachment with Arriflex Eyepiece (both not shown here). A lid is secured to the Adapter Tube to hold the Retaining Ring in place on the Adapter Tube but allowing the Retaining Ring to Rotate so it can be screwed onto another device such as a Periscopic Viewer, although other means can be used to secure such device besides the Retaining Ring. The other end of the Adapter Tube is secured to the Viewfinder Base which is mounted on but not limited to a digital cinema camera such as the Red Komodo. The combination of parts creates an Adjustable Digital Cinema Camera Optical Adapter.

The camera operator attaches the Adjustable Digital Cinema Optical Viewfinder to their camera such as but not limited to a Red Komodo via a Viper Gears Ninja Adapter Plate or some other means over the camera display and is then able to view the full display from the camera display through the new traditional-style motion picture viewfinder like those for the Arriflex 16S, BL, and SR cameras from the side of the camera and multiple adjustable positions like a traditional cinema camera which is the optimally accessible method of viewing the camera image for many operators as it allows for traditional handheld shoulder mount work where the bulk of the weight of the camera rig falls onto the shoulder and center body mass of the operator which is the most stable method of handheld camera operation.

In some embodiments, the invention enables a camera operator to view the camera LCD display image of a digital cinema camera such as but not limited to a Red Komodo in the manner of traditional motion picture cameras as using an adjustable optical viewfinder from diverse angles including from the side of the camera facing front, as done in traditional hand-held and tripod-mounted camera operation. In some embodiments, the invention improves the capabilities of certain existing optical viewfinders used with the Red Komodo or similar cameras by creating a fully adjustable option.

Prior to this invention, the only side or adjustable viewfinders for a digital cinema camera such as the Red Komodo were electronic monitor accessories that receive a video feed from the camera either by wire or wireless means, or a static optical viewfinder mounted on the digital display screen of the camera. In some embodiments, this invention allows for the operation of a digital cinema camera such as the Red Komodo by optically accessing the image from the camera LCD display through the adjustable optical viewfinder such as but not limited to a medium format or similar optical viewfinder with a cinema camera optical viewfinder such as those for Arriflex motion picture cameras such as the 16S, BL, and SR, which is more accessible for camera operation, giving the operator an Adjustable Digital Cinema Camera Optical Viewfinder useful for diverse camera operations such as handheld and tripod-mounted. In some embodiments, this invention creates an option for an operator of a camera such as but not limited to the Red Komodo to view the camera image optically from the side of the camera or almost any angle without needing additional power sources, cables, or digital, electronic, or network connectivity.

In some embodiments, the invention creates a new type of optical viewfinder to use with a Red Komodo or similar digital video camera that has a mounting adapter attached like the ViperGears Ninja Adapter Plate that accepts medium format viewfinders like the Hasselblad HC-4. A custom developed device can be created which utilizes similar optics and configuration of the two combined viewfinders with the Optical Adapter but is manufactured as a new item. In some embodiments, this invention can be adapted for additional digital cameras such as but not limited to Canon patent application 2023024538 (Japan, published Feb. 16, 2023).

Prior to this invention, existing technologies did not allow a camera operator to view the image of but not limited to certain digital cinema cameras such as a Red Komodo in the traditional way of a motion picture film camera by means of an adjustable optical viewfinder from diverse angles, including from the side of the camera facing front, as done in traditional handheld or tripod work without any external electronic viewing device. In some embodiments, this invention enables preferable optical performance for viewing the LCD display image from a digital cinema camera such as but not limited to a Red Komodo through an adjustable motion picture camera optical viewfinder by connecting such a viewfinder at the correct distance another viewfinder such as but not limited to a prism viewfinder mounted over the camera LCD display. By connecting the two viewfinders together at the correct distance, and mounting the whole assembly over the camera LCD display, the correct image size and focus when viewing the camera LCD display through the motion picture viewfinder eyepiece are visible, creating a functioning Adjustable Digital Cinema Camera Optical Viewfinder.

Example Embodiments of the Invention Includes

Embodiment 1. An imaging apparatus, comprising: a housing having two mount parts to which at least two optical imaging apparatuses are attached; and the image from the first is visible through the second such that the subject of the first which is the LCD display screen of a digital cinema camera such as but not limited to the Red Komodo to which it is mounted over, is visible to the viewer in focus and in full through the second apparatus, which can be adjusted to diverse angles including to the side of the camera. As used throughout this disclosure, the diverse angles can include any desired angle. For example, the mounting can be normally, at 90 degrees, in reverse, at 270 degrees, or any other desired angle.

Embodiment 2. The imaging apparatus, according to Embodiment 1, wherein the first imaging apparatus such as but not limited to the prism array of a Hasselblad HC-4 still film camera viewfinder minus the eyepiece, is mounted in reverse over the LCD display screen of a digital cinema camera such as but not limited to the Red Komodo via a mount such as the Viper Gears Ninja Adapter Plate, and one end is attached to the first imaging apparatus and the opposite end is attached to a second imaging apparatus that consists of a motion picture optical viewfinder and periscopic attachment such as those used with Arriflex motion picture cameras such as but not limited to the Arriflex 3511C, 16M, 16S, 16BL, and 16SR1, and 2 series, the resulting combination of imaging apparatuses and the camera LCD display is configured to be visible through the eyepiece of the viewfinder of the second imaging apparatus, allowing the operator to hold the camera over the shoulder or from diverse angles as with a traditional motion picture camera such as but not limited to an Arriflex BL and still clearly see the camera LCD display image in focus and whole.

Embodiment 3. An imaging apparatus, comprising: an assembly and configuration of the various imaging apparatuses referred to in Embodiment 1, create a new imaging apparatus that is an Adjustable Digital Cinema Camera Optical Viewfinder that functions in like manner as a traditional motion picture optical viewfinder, and makes the digital cinema camera LCD display screen fully visible and in focus to the camera operator while using the new apparatus and gaining the additional adjustable functionality and use of an adjustable motion picture optical viewfinder.

Embodiment 4. The imaging apparatus, according to Embodiment 1 can also be utilized with just an eyepiece viewfinder as the second apparatus without a periscopic attachment, mounted onto one end which is mounted via the opposite end onto the first imaging apparatus which is mounted over the LCD display of a digital cinema camera such as but not limited to a Red Komodo, and a focused whole view of the camera LCD display is provided to the viewer.

Various modifications and variations of the described devices and methods of the invention will be apparent to those skilled in the art without departing from the scope and spirit of the invention. Although the invention has been described in connection with specific embodiments, it will be understood that it is capable of further modifications and that the invention as claimed should not be unduly limited to such specific embodiments. Indeed, various modifications of the described modes for carrying out the invention that are obvious to those skilled in the art are intended to be within the scope of the invention. This application is intended to cover any variations, uses, or adaptations of the invention following, in general, the principles of the invention and including such departures from the present disclosure come within known customary practice within the art to which the invention pertains and may be applied to the essential features herein before set forth.

The invention claimed is:

1. An adapter apparatus comprising:
a housing comprising two mount parts,
wherein when a first and a second optical imaging apparatuses are attached to the housing, an image from the first optical imaging apparatus is visible through the second optical imaging apparatus such that a subject of the first optical imaging apparatus is visible to a viewer in focus and in full through the second optical imaging apparatus,
wherein the subject of the first optical imaging apparatus is a display screen of a camera over which the first optical imaging apparatus is mounted,
wherein a first of the two mount parts mounts to the display screen, and
wherein a second of the two mount parts mounts to a viewfinder of the second optical imaging apparatus.

2. The adapter apparatus of claim 1, wherein the camera is a digital cinema camera.

3. The adapter apparatus of claim 1, wherein the second optical imaging apparatus is adjustable to different angles.

4. The adapter apparatus of claim 3, wherein the second optical imaging apparatus is adjustable to a side of the first optical imaging apparatus.

5. An imaging apparatus comprising the adaptor apparatus of claim 1, the first optical imaging apparatus, and the second optical imaging apparatus.

6. A method of capturing an image of a subject comprising attaching the adapter apparatus of claim 1 to a camera and using the camera to capture images.

7. An adapter apparatus comprising:
a housing comprising two mount parts,
wherein when a first and a second optical imaging apparatuses are attached to the housing, an image from the first optical imaging apparatus is visible through the second optical imaging apparatus such that a subject of the first optical imaging apparatus is visible to a viewer in focus and in full through the second optical imaging apparatus, wherein the first optical imaging apparatus is mounted in reverse over a display screen of a camera via at least one of the mounting parts, and one end of the adapter apparatus is attached to the first optical imaging apparatus and the opposite end of the adapter apparatus is attached to the second optical imaging apparatus,
wherein the second optical imaging apparatus comprises a viewfinder,
wherein the resulting combination of the first and the second optical imaging apparatuses and the adapter apparatus causes the display screen to be visible through an eyepiece of the viewfinder of the second optical imaging apparatus, thus allowing an operator to hold the camera over the shoulder of the operator or from a different angle, and still see the display screen in focus and whole.

8. The adapter apparatus of claim 7, wherein the camera is a digital cinema camera.

9. The adapter apparatus of claim 7, wherein the second optical imaging apparatus comprises a periscopic attachment.

10. The adapter apparatus of claim 7, wherein the second optical imaging apparatus does not comprise a periscopic attachment.

11. An adapter apparatus comprising:
a housing comprising two mount parts,
wherein when a first and a second optical imaging apparatuses are attached to the housing, an image from the first optical imaging apparatus is visible through the second optical imaging apparatus such that a subject of the first optical imaging apparatus is visible to a viewer in focus and in full through the second optical imaging apparatus, further comprising: an adapter tube with a retaining threaded screw mount: one or more optional reinforcement pieces to fit inside the adapter tube; a retaining ring; a base; and a lid for the retaining ring to secure the retaining ring to the adapter tube.

12. The adapter apparatus of claim 11, wherein the lid secures the retaining ring and is rotatable.

13. The adapter apparatus of claim 11, wherein the optional reinforcement pieces are present and provide adjustable length to the adapter apparatus.

14. A camera comprising the adapter apparatus of claim 11 attached to the camera.

15. A method of capturing an image of a subject comprising attaching the adapter apparatus of claim 11 to a camera and using the camera to capture images.

16. The adapter apparatus of claim 11, wherein the subject of the first optical imaging apparatus is a display screen of camera over which the first optical imaging apparatus is mounted.

17. The adapter apparatus of claim 11, wherein the second optical imaging apparatus is adjustable to different angles.

18. The adapter apparatus of claim 14, wherein the camera is a digital cinema camera.

* * * * *